March 8, 1966  M. M. NYBORG ETAL  3,239,644
WELDING APPARATUS

Filed Aug. 12, 1963  3 Sheets-Sheet 1

INVENTORS.
MEREDITH M. NYBORG
BY STANLEY BELL
Elliott & Pastoriza
ATTORNEYS

March 8, 1966  M. M. NYBORG ETAL  3,239,644

WELDING APPARATUS

Filed Aug. 12, 1963  3 Sheets-Sheet 2

INVENTORS.
MEREDITH M. NYBORG
BY STANLEY BELL
Elliott & Pastoriza
ATTORNEYS

March 8, 1966   M. M. NYBORG ETAL   3,239,644
WELDING APPARATUS

Filed Aug. 12, 1963   3 Sheets-Sheet 3

INVENTORS.
MEREDITH M. NYBORG
BY STANLEY BELL
Elliott & Pastoriza
ATTORNEYS

United States Patent Office 3,239,644
Patented Mar. 8, 1966

1

3,239,644
WELDING APPARATUS
Meredith M. Nyborg and Stanley Bell, Camarillo, Calif.,
assignors, by direct and mesne assignments, of eighty-
five percent to said Nyborg and fifteen percent to Galt
Whipple, Sirni, Calif.
Filed Aug. 12, 1963, Ser. No. 301,476
11 Claims. (Cl. 219—80)

This invention relates generally to welding apparatus and more particularly, to an improved automatic seam welding apparatus for providing metal-to-metal hermetic seals between thin metal parts and heavier metal members.

In automatic welding equipment heretofore available, a welding electrode was caused to be lowered on a workpiece and high current passed through the electrode to effect a "spot" weld. To provide a "seam" or continuous weld about the periphery of an object as would be required to form a hermetic seal for a metal diaphragm, by way of example, a succession of overlapping spot welds may be used.

In order that each successive spot weld be consistent to insure the integrity of the entire annular seam weld, it is extremely important that the pressure of the electrode be constant. In prior machines, the electrode pressure has been provided pneumatically, electrically or manually. In all such instances, it is difficult to insure a constant electrode pressure because of variations in pneumatic pressure, electrical voltage, or manually applied pressures. In the case of pneumatic or electrically applied pressures, costly pressure regulators or electrical voltage regulators have usually been required.

Another important consideration in such type seam welding is to insure consistency between successive spot welds to provide the desired overlap. Towards this end, it is important that some means be provided for varying the spacing between welds depending upon the diameter of the work to be welded as well as other considerations such as electrode pressure and weld current which will vary the diameter of the individual spot welds. If the work is caused to be rotated beneath a welding head electrode, there must be provided reliable means for conducting the welding current from a movable part. Conventional slip rings and the like are subject to wear and pitting and thus it is difficult to insure a constant weld current.

Other considerations in providing a seam welding apparatus is to insure against the possibility of "dropping a stitch." Towards this end, when an automatic system is employed, it is important that the weld cycle consistently stop at the same point. Moreover, it is desirable to enable only single cycles to be effected to facilitate initial adjustments. With respect to such adjustments, the workpiece and weld head assembly should be positioned for easy visual observation while the weld is taking place.

With all of the foregoing in mind, it is accordingly a primary object of this invention to provide a greatly improved automatic seam welding apparatus in which the foregoing considerations are all taken into account to the end that a very rapid and simple means is provided for effecting metal-to-metal hermetic seals and the need for complex and costly tooling, chill blocks, furnace fixtures, and the like are eliminated.

More particularly, it is an object to provide an automatic welding apparatus in which a sequential welding cycle is provided and is always completed, the first action being a weld, and the last action being an indexing action of the workpiece to a position preparatory to the next weld at the beginning of the next cycle. By insuring that a cycle will always be completed regardless of the operation of the switches on the machine, the possibility of

2 human error is substantially reduced and it will always be assured that the last spot will overlap the first.

Another object is to provide a novel weld head assembly in which the weld electrode pressure is adjustable and once adjusted will be consistent regardless of any changes in pneumatic pressures or electrical voltages employed in the system.

Another object is to provide an automatic welding apparatus including a selector switch in which individual cycles may be effected at the will of the operator when a switch is in one position and in which a complete 360 degree seam weld may be automatically effected when the switch is placed in another position, the apparatus automatically terminating welding operations at the completion of the 360 degree seam weld.

Still another important object is to provide a novel means for indexing a workpiece and conducting welding current from the workpiece to the end that conventional type slip rings and brushes need not be used.

Other important objects are to provide a welding apparatus for 360 degree seam welding in which the circumferential distance between successive spot welds may be adjusted, the speed of effecting the 360 degree weld may be adjusted, and in which the workpiece may be adjusted in horizontal and vertical directions and consistently repositioned.

Still other objects are to provide a welding apparatus incorporating foot pedals as well as manual controls to facilitate initial setting up adjustments and also enable one-shot operations of the welding apparatus, the use of foot pedals permitting the operator's hands to be free for handling the workpiece for purposes of repositioning.

Another important object is to provide an over-all welding apparatus in which the weld head electrode and workpiece holding structure are conveniently positioned for easy visual observation of the entire welding operation.

Briefly, these and many other objects and advantages of this invention are attained by providing a welding apparatus including a weld head assembly for moving a welding electrode, a welding current power supply for passing welding current to the weld head assembly, and a holding collet and indexing unit for holding a workpiece in position to be engaged by the welding electrode together with means for rotating the workpiece through discrete circumferential distances. Also provided is an electromechanical and pneumatic control means interconnected with the weld head assembly, welding current power supply, and holding collet and indexing unit for operating these components in a sequential cycle. In this sequential cycle, the welding electrode is caused to engage the workpiece, welding current is passed therethrough, the welding electrode is then moved away from the workpiece, and the workpiece is then rotated by the holding collet and indexing unit through a discrete circumferential distance.

In the foregoing cycle, the first step is always the lowering of the electrode and welding of the piece and the last step is always the indexing of the collet to move the workpiece in a position for a subsequent weld at the initiation of the next cycle. The arrangement is such that even if a stop switch is actuated during the middle of the cycle, the apparatus will still automatically complete the cycle so that the last step is always the indexing step. By this arrangement, it is insured that no "stitches" will be dropped" so that the last weld spot will overlap the first weld spot when a 360 degree seam weld is effected. Further, inadvertent operation of the stop switch will not terminate operation of the apparatus until the particular cycle taking place has been completed.

Suitable selector switch means are provided to actuate the control means in a manner for automatically repeating the cycles until the workpiece has been indexed through 360 degrees, the apparatus then automatically shutting itself off. Thus, the operator may effect one-shot welding cycles or place the machine in automatic operation for a continuous 360 degree weld.

The holding collet and indexing unit itself includes an over-riding clutch mechanism and incorporates a conducting structure serving the dual function of holding an inner clutch race in a moved position by an outer clutch race and also conducting current from the workpiece and collet structure to a stationary terminal. Since this structure exerts a frictional drag on the indexing mechanism, there is always insured an excellent metal-to-metal electrical engagement for proper conduction of welding current.

The weld head assembly is actuated pneumatically in such a manner that only pneumatic or equivalent automatic means is employed to raise or remove the welding electrode from the work. The engagement of the welding electrode on the work, on the other hand, is controlled by a mechanical spring so that the pressure of the electrode will always be consistent regardless of any changes in pneumatic pressure or electrical voltage. The force exerted by this spring may be manually adjusted.

The basic components or units for holding and indexing the workpiece are mounted on suitable means for effecting horizontal and vertical movement of the workpiece so that it may be adjusted relative to the welding electrode. Further, the arrangement is such that the workpiece is in a position for easy visual observation during a welding operation.

A better understanding of the invention as well as various further features and advantages thereof will be had by now referring to a preferred embodiment as illustrated in the accompanying drawings, in which.

Figure 1:
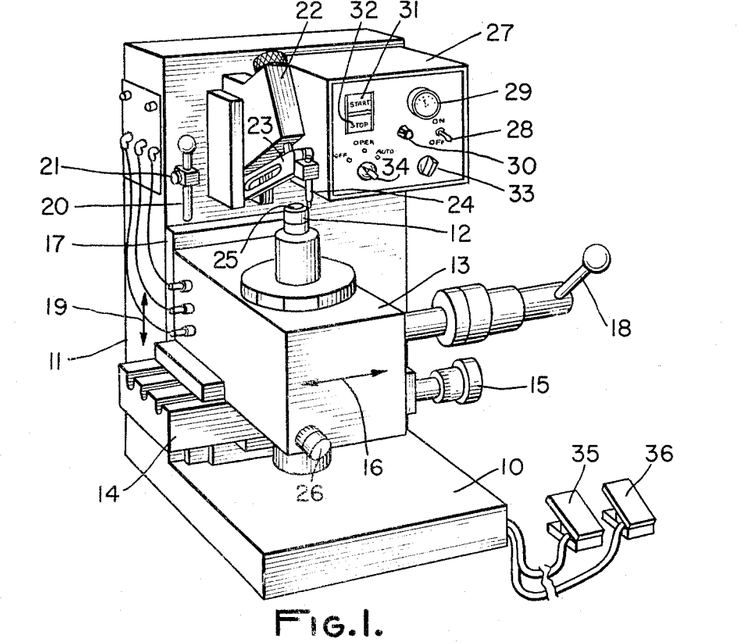
FIGURE 1 is a perspective view of the welding apparatus of this invention.

Referring first to FIGURE 1, the welding apparatus includes a base support 10 to which a drive unit housing 11 is secured. As shown, the drive unit housing 11 extends vertically upwardly from the rear portion of the base 10 and incorporates suitable electro-mechanical and pneumatic control means. In the center of FIGURE 1 there is shown a workpiece holding collet 12 mounted above an indexing unit 13. This indexing unit 13 in turn is mounted for horizontal sliding movement on a slide structure 14, the horizontal positioning of the holding collet and indexing unit being adjusted by vernier knob 15 so that left and right horizontal movement in the direction of the double-headed arrow 16 can take place.

The entire slide structure including the indexing unit is mounted to a vertical slide support 17 secured to the front of the drive unit housing 11. A T handle 18 is used to raise and lower the structure as a unit relative to the housing 11 as indicated by the double-headed arrow 19.

In order that the structure may be raised to a consistent level, an "Up-stop" rod 20 may be provided secured to the drive unit housing 11 and adjustable by a set screw 21 so that the lower end of the rod 20 will engage the vertical slide 17 and thus check upward movement thereof to a consistent level.

Projecting from the drive unit housing 11 in a position over the holding collet structure 12 is a weld head assembly 22 including a pivoted weld arm 23 terminating at one end in a welding electrode 24. The arm 23, as will become clearer as the description proceeds, is pivoted intermediate its ends in such a manner that the electrode 24 may be raised and lowered relative to a workpiece 25 positioned in the holding collet 12.

In effecting a spot weld, a weld is first effected by the electrode 24 and the workpiece 25 is then rotated by the collet and indexing unit 13 through a discrete distance. The circumferential distance through which the workpiece 25 is rotated may be controlled by a knob 26 projecting from the front of the indexing unit 13.

Additional controls for operating the welding apparatus are incorporated in a control box 27 mounted to the upper right hand portion of the drive unit housing 11. The front panel of this control box 27 includes an air pressure on-off toggle switch 28, an air pressure gauge 29, and an air pressure regulator adjusting knob 30. These controls enable pneumatic pressure to be applied to the system and the magnitude of this pressure to be adjusted.

The front panel of the control box 27 also includes a start button 31, a stop button 32, a speed control 33 for varying the speed of an automatic seam welding operation, and a selector switch 34 which has three positions marked "off," "operator," and "auto."

Cooperating with the foregoing controls are foot pedals 35 and 36 shown in the lower right portion of FIGURE 1. The right foot pedal 36 serves to open the holding collet 12 when depressed to enable removal of the workpiece 25. The left foot pedal 35 will initiate a single welding cycle.

In the operation of the apparatus of FIGURE 1, an operator will first position a workpiece 25 in the holding collet 12. Towards this end, the vertical slide adjust T handle 18 may be moved to lower the holding collet 12 to be free of the welding electrode 24. The operator now turns on the air pressure toggle switch 28 shown on the front of the control panel 27 which will supply air pressure to the system. This air pressure will close the collet 12 on the workpiece 25. If the operator wishes to open the collet, he may depress the foot pedal 36 and readjust the workpiece 25 or replace it with another workpiece. Releasing of the pedal 36 will cause the collet 12 to automatically close provided that the toggle valve 28 is in its "on" position.

Next the operator will raise the entire holding collet and indexing unit structure by means of the T bar 18 until the vertical slide mounting 17 engages the bottom of the up-stop rod 20. As stated heretofore, the positioning of the up-stop rod may be varied in order that the workpiece 25 will be brought into proper engagement with the tip of the welding electrode 24. The horizontal slide control vernier 15 is also adjusted to bring the tip of the electrode 24 in a proper position against the periphery of the workpiece in the event that a 360 degree seam weld is to be effected about the periphery of the workpiece.

Once the proper positioning of the up-stop rod 20 has been effected, the set screw 21 may be tightened to that subsequent workpieces will be consistently positioned at the same vertical level.

In certain operations, it may be desirable to perform inside diameter welding or welding of conical surfaces. Towards this end, the slide assembly may be removed and rotated 90 degrees and remounted on the vertical slide so that the axis of rotation of the holding collet is horizontal. The work may then be brought into juxtaposition with the welding electrode 24 by simply raising and lowering the vertical slide adjustment as described heretofore.

With the workpiece positioned as desired, the operator may then turn the selector switch 34 to the "operate" contact. In this position, the operator may depress the left foot pedal 35 and cause the apparatus to go through a single welding cycle. This welding cycle will consist of the welding electrode 24 engaging the work and welding current being passed therethrough. The electrode 24 will then automatically be raised and the indexing unit 13 will index or turn the workpiece and holding collet through a discrete circumferential distance. If the operator again depresses the foot pedal 35 the cycle will be repeated. If the operator holds the pedal 35 downwardly continuously, the cycle will be continuously repeated. The same one cycle or continuous cycle operation may be effected by depressing the start button 31. If the operator holds this start button 31 depressed, successive cycles will automatically take place.

After suitable trial welds have been effected and all adjustments made, the operator may switch the selector switch 34 to the automatic terminal. When in this position and upon depression of the start button 31, a series of cycles will automatically be carried out until a 360 degree indexing of the workpiece has been effected. At the end of this 360 degree indexing the apparatus will automatically stop. The workpiece may then be removed by operating the pedal 36 to open the collet and a new workpiece substituted. Another 360 degree cycling operation can then be effected by again depressing the start button 31.

The manner in which the foregoing operations are carried out will now become clear by reference to the remaining figures relating to the various components described in FIGURE 1.

Figure 2:
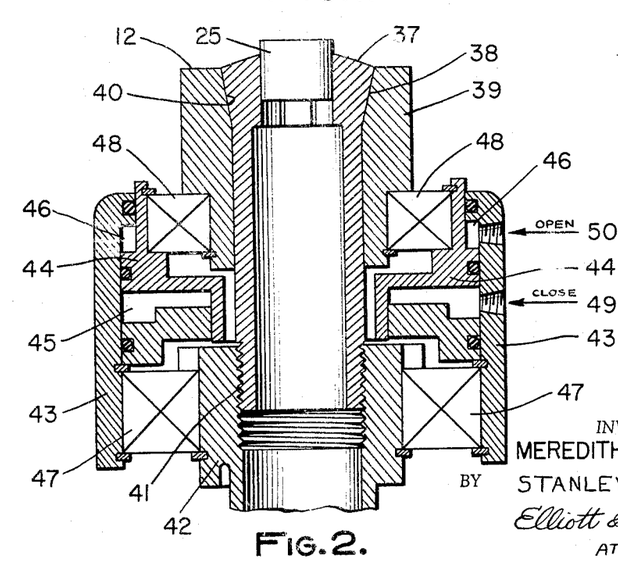
FIGURE 2 is an enlarged fragmentary cross-section of the workpiece holding collet portion of the apparatus illustrated in FIGURE 1.

Referring first to FIGURE 2, there is shown a fragmentary cross-section of the holding collet structure 12. As shown, this structure includes a collet 37 having an exteriorally tapered annular wall 38 cooperating with a spindle nose 39 including an interiorally tapered annular wall 40. The collet 37 is split at three points so that when the spindle nose 39 is raised upwardly, the tapering surfaces 38 and 40 will cause a radial contraction of the upper collet portions to take place and thereby tightly grip the workpiece 25. It will be noted that the lower end of the collet 37 is threaded as at 41 to a tail piece 42. The degree of threading of the collet 37 within the nose piece 42 will enable adjustment of the gripping force by changing the relative positions of the tapered surfaces prior to the raising or lowering of the nose piece 39.

This raising and lowering of the nose piece 39 is effected by pneumatic means including an air cylinder 43 incorporating an annular piston 44. The piston divides the interior of the cylinder 43 into lower and upper chambers 45 and 46 respectively. The tail piece 42, collet 37 and spindle nose 39 are all capable of rotating within the cylinder 43 by suitable lower and upper bearings 47 and 48. The upper bearing 48, as shown, is locked to the piston 44 so that when the piston 44 is raised within the cylinder 43, it will raise the nose piece 39 and thus cause radial inward movement of the upper portion of the collet 37 to grip the workpiece 25. In this respect, the collet 37 is prevented from vertical movement as a consequence of its threaded connection at 41 to the tail piece 42.

To raise and lower the piston 44 and thus the spindle nose 39, there are provided lower and upper ports 49 and 50 communicating with the lower and upper chambers 45 and 46 respectively. When air pressure is provided in the lower port 49, the piston 44 will be raised upwardly to lock the collet to the workpiece 25. When air pressure is applied to the upper opening 50 to be received in the upper chamber 46, the piston 44 will be moved downwardly to release the workpiece 25.

The provision of air pressure to the respective ports 49 and 50 is under the control of the operator by means of the right hand foot pedal 36 described in conjunction with FIGURE 1, the actual connections of which will become clearer as the description proceeds.

Figure 3:
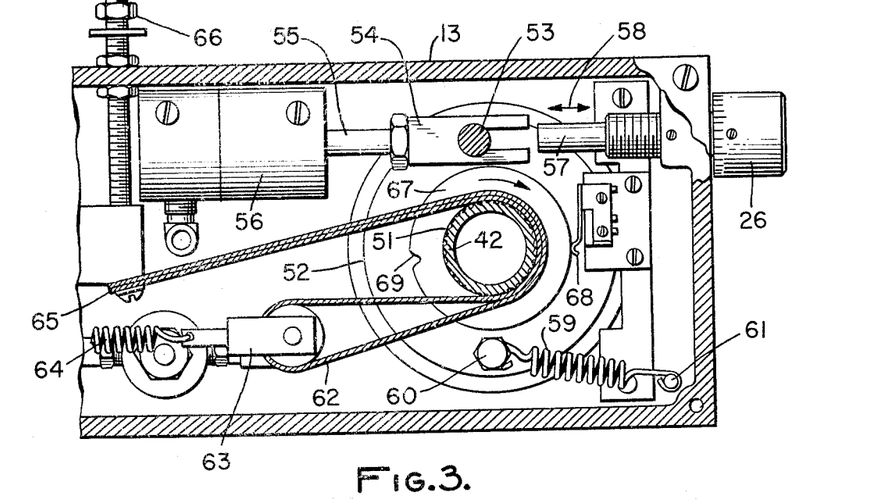
FIGURE 3 is a plan fragmentary cross-section of portions of the indexing unit for rotating the holding collet of FIGURE 2.

Referring now to FIGURE 3, the manner in which the nose piece 42, collet 37 and spindle nose 39 are rotated within the bearings 47 and 48 of FIGURE 2 for proper indexing of the workpiece will become clear. FIGURE 3 represents a cross-section in plan of a portion of this indexing unit. As shown, the tail piece 42 extends downwardly within the indexing unit housing 13. Secured to the exterior annular surface of the tail piece 42 is an inner clutch race 51 cooperating with an outer clutch race structure 52. The outer clutch race structure 52 includes a vertically extending pin 53 rigidly secured thereto. The pin 53 is arranged to cooperate with a clevis 54 on the end of a piston rod 55 operating within a pneumatic cylinder 56. Also provided is a stop pin 57 extending towards the pin 53 and adjustable as to extent as indicated by the double-headed arrow 58. The degree of extent of the pin 57 is under control of the knob 26 protruding from the front of the indexing unit 13 as described in conjunction with FIGURE 1. Threading this knob 26 in a clockwise direction will move the stop pin 57 towards the projecting pin 53 on the outer clutch 52 and thus limit the circumferential distance through which this outer clutch race structure 52 may be moved.

As shown in the lower portion of FIGURE 3, there is provided a return spring 59 secured to the outer clutch race 52 as at 60 at one end and having its other end secured to the housing 13 as at 61. This spring will always bias the projecting pin 53 into the clevis structure 54, bottoming of the piston within the cylinder 56 preventing further counterclockwise movement of the outer clutch race 52 beyond a given distance.

Also cooperating with the lower end of the tail piece 42 is a conducting means in the form of a strap 62 having an intermediate portion wrapped partially about the tail piece 42 as shown and having one folded end coupled at 63 to a biasing spring structure 64 to exert a tension on the strap 62. The other ends of this strap extend to a terminal 65 to which they are rigidly secured. This conducting strap 62 serves a dual function. First, it will provide a friction drag on the tail piece 42 to prevent overshooting and prevent any reversing movement of the tail piece 42 when the clutch mechanism is operated. Secondly, it provides a conducting path for welding current from the workpiece through the collect structure and tail piece 42 to the terminal 65. As shown, this terminal 65 extends to an external terminal 66 for connection to a welding current power supply.

The indexing unit also includes a cam disc 67 cooperating with a micro-switch arm 68. This cam disc 67 is rigidly secured to and rotates with the tail piece 42. As shown, the cam disc 67 includes an indent 69. When this indent 69 is juxtaposed the micro-switch arm 68, the micro-switch 68 will automatically open. By this arrangement, operating of the welding apparatus may be terminated after one 360 degree rotation of the tail piece and collect structure.

In the operating of the indexing unit shown in FIGURE 3, pneumatic pressure supplied to the cylinder 56 will cause the clevis 54 to move to the right thereby urging the pin 53 to the right until it engages the stop pin 57. Rotation of the outer clutch race 52 will result in rotation of inner clutch 51 and the tail piece 42 and thus the holding collect structure to rotate the workpiece through a discrete circumferential distance. As stated, this discrete circumferential distance is determined by the adjustment of the stop pin 57. When pressure is relieved from the cylinder 56, the return spring 59 will then move the outer clutch race structure 52 in an opposite direction, the clutching surfaces between the inner clutch race 51 and outer clutch race 52 being such that no gripping action is effected when the outer clutch race 52 is rotated in a counter-clockwise direction. In this respect, the strap 62 exerting a frictional drag on the tail piece 42 will prevent back movement when the clutch 52 is moved in a reverse direction. When the cylinder 56 is again provided with pressure, the clevis 54 will again urge the pin 53 against the stop 57 to again effect an incremental rotation of the tail piece 42.

As stated, after a complete 360 degree indexing operation, the indent 69 will be juxtaposed the micro-switch arm 68 to de-energize the micro-switch and terminate operation of the apparatus. In the position shown in FIGURE 3, approximately half of a 360 degree weld cycle has been completed.

Figure 4:
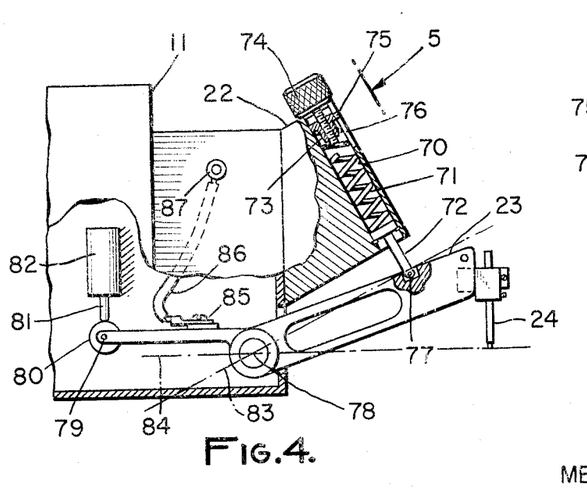
FIGURE 4 is a side elevational view partly in cross-section of the welding head assembly.

Referring now to FIGURE 4, there is illustrated a fragmentary cross-section of the weld head assembly 22 and weld arm 23 described in conjunction with FIGURE 1. As shown, the weld head assembly structure 22 is rigidly secured to the housing 11 and includes an angulated portion incorporating an elongated bore 70. Within this bore 70 there is housed a compression spring 71 bearing against a push member 72 the lower end of which is coupled to the weld arm 23. The upper end of the spring 71 engages a travelling nut 73 arranged to be moved downwardly by rotation of a knob 74. The nut 73 is keyed against rotation by a small key 75 riding in a slot 76. By this arrangement, the pressure exerted by the spring 71 may be varied by rotating the knob 74.

The extreme lower end of the push member 72 may be coupled as by a loose pivot pin 77 to the weld arm 23. The weld arm 23 itself is intermediately pivoted to the structure 22 as at 78 for swinging or rocking movement in a vertical plane. The inner end of the weld arm 23 terminates in a journal pin 79 supporting a roller 80. The roller 80 is arranged to be engaged by a piston 81 projecting downwardly from a cylinder 82. With this arrangement, pneumatic pressure applied to cylinder 82 to lower the piston rod 81 will result in the weld arm 23 rocking about the pivot point 78 so that the electrode 24 is raised. Exhausting of air from the cylinder 82 to raise the piston 81 will then permit the spring 71 to push rod member 72 against the weld arm 23 to lower the electrode 24.

The physical arrangement of the above-described components is such that a straight line 83 drawn between the point of bearing connection between the push rod 72 and the weld arm 23 as at 77 and the pivot point 78 is normal to the direction of movement of the push rod 72. That is, the line 83 is normal to the axis of the bore 70 so that substantially negligible transverse movement of the point 77 takes place when the rod 72 moves back and forth within the bore 70. Similarly, a straight line 84 drawn between tip of the electrode 24 and the pivot 78 of the weld arm is exactly horizontal so that downward movement of the tip of the electrode 24 will be in a vertical direction or parallel to the axis of rotation of the holding collet.

A terminal 85 is connected to the weld arm 23 from which a flexible lead 86 extends to an external terminal 87. Thus welding current is passed to the electrode 24 through the terminal 87, flexible lead 86 and weld arm 23. By connecting the terminal 87 and the terminal 66 in the indexing unit described in conjunction with FIGURE 3 to a suitable source of high welding current, the welding current circuit will be completed through the work when the welding current power supply is energized.

Figure 5:
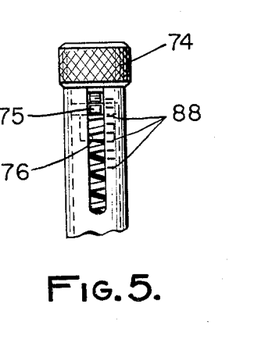
FIGURE 5 is a fragmentary elevational view of a portion of the welding head assembly taken in the direction of the arrow 5 of FIGURE 4.

FIGURE 5 shows a fragmentary portion of the upper end of the weld structure 22 wherein it will be noted that a scale 88 may be provided for comparison with the position of the key 75 on the traveling nut 73. This scale 88 is arbitrary but will enable consistent resetting of the spring pressure so that a consistent electrode pressure will be provided.

An important feature of the structure described in FIGURE 4 is the fact that pneumatic pressure is only used to raise the weld arm, the spring itself being the sole force applied in lowering the weld arm and defining the electrode pressure. In this respect, the piston 81 is caused to retract upon exhaustion of the air from the cylinder 82 by any suitable biasing spring means so that it is completely out of engagement with the roller 80 when the cylinder 82 is not energized. Thus, a constant or consistent electrode pressure is always provided even though there may be electrical or air pressure variations in the system.

Figure 6:
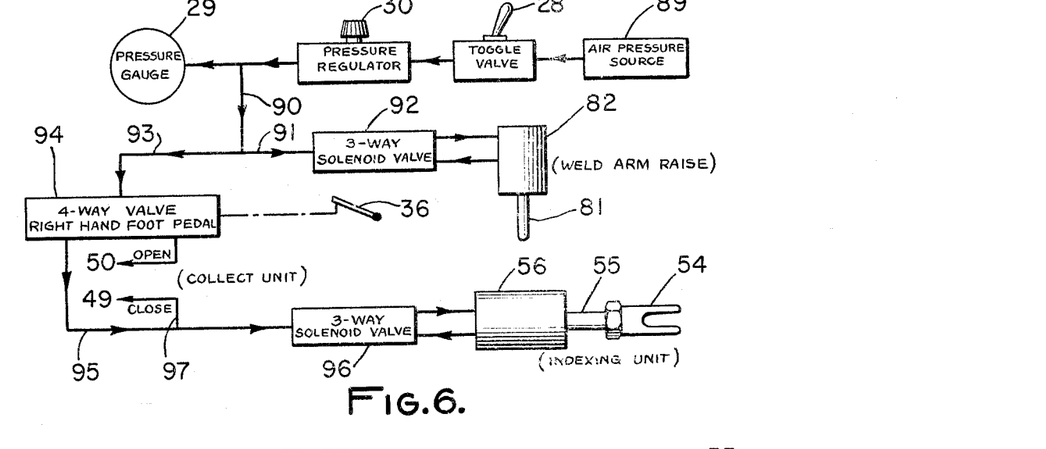
FIGURE 6 is a schematic diagram of the pneumatic portion of the apparatus.

FIGURE 6 is a schematic diagram of the pneumatic portion of the control system in the welding apparatus. In FIGURE 6 the various switches, pneumatic cylinders, and piston rods and other components are designated by the same numerals employed to describe these elements in conjunction with the preceding figures. Thus, referring to the upper right hand portion of FIGURE 6, there is shown a source of air pressure 89 for passing air through the toggle valve switch 28 on the front panel described in conjunction with FIGURE 1 to a pressure regulator. This pressure controls the pressure passed to the pressure gauge 29 by the pressure control knob 30 also described in conjunction with FIGURE 1. From the output of the pressure regulator, regulated air pressure is passed through a branch line 90 to a line 91 terminating in a three-way solenoid valve 92. The three-way solenoid valve 92 is arranged to be operated by an electrical signal and when operated will provide pressure to the weld arm raise cylinder 82 to extend the piston rod 81 and raise the weld arm as described in conjunction with FIGURE 4. Cessation of the electrical signal to the three-way solenoid valve 92 in turn will result in the air in the cylinder 82 being exhausted.

The line 90 also branches into another line 93 passing to a four-way solenoid valve 94. This four-way solenoid valve 94 is arranged to be operated by the right hand foot pedal 36 and includes an outlet line 95 passing to another three-way solenoid valve 96. The three-way solenoid valve 96 is responsive to an electrical signal to provide air to the cylinder 56 to extend the piston rod 55 and clevis 54 to effect indexing of the holding collet as described in conjunction with FIGURE 3. Thus, when an electrical signal is received in the three-way solenoid valve 96, air pressure will be passed to the cylinder 56 to effect an indexing operation and when the signal is removed from the three-way solenoid valve 96, air pressure is exhausted from the cylinder 56 to permit the outer clutch to retract as described.

From the output line 95 passing from the four-way valve 94 there is provided another branch line 97 providing air pressure to the collet unit cylinder port 49 to raise the piston and effect closing of the collet. Operation of the right hand foot pedal 36 on the other hand will close off pressure in the line 95 and provide pressure in the line passing to the upper port 50 of the collet unit cylinder to open the collet.

Figure 7:
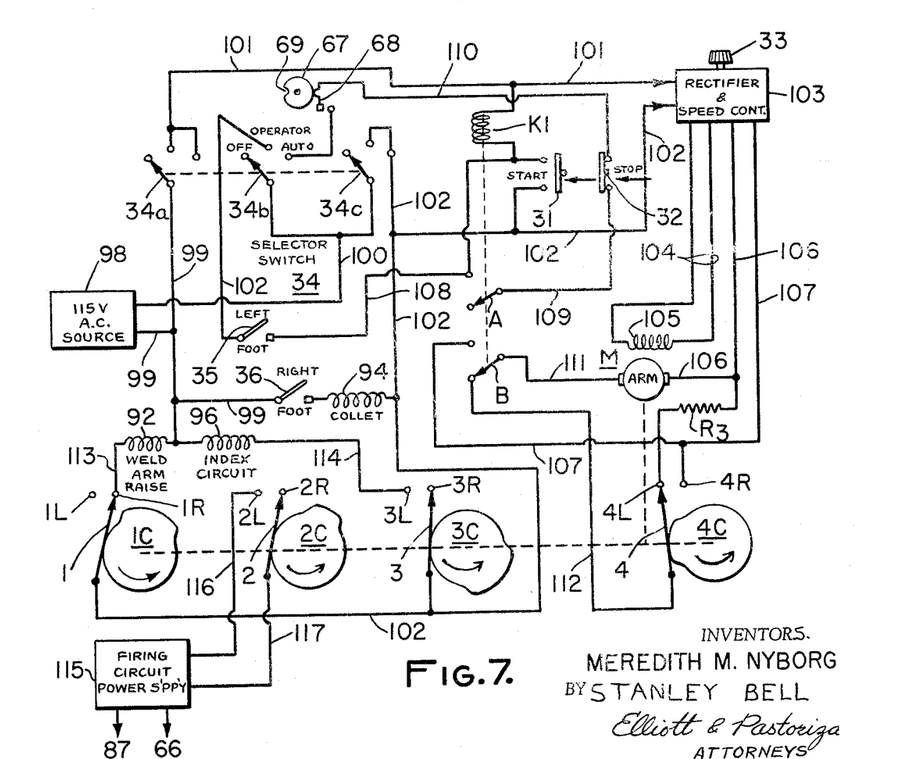
FIGURE 7 is an electro-mechanical schematic diagram useful in explaining the operation of the apparatus.

FIGURE 7 is an electro-mechanical diagram illustrating portions of the control means for providing signals to operate the three-way solenoid valves and to effect the desired cycling operations. In FIGURE 7, various switches described on the front panel of the control box of FIGURE 1 and the control pedals are designated by the same numbers. Referring to the center left hand portion of FIGURE 7, there is shown a 115 volt A.C. electrical power source 98 from which extend power leads 99 and 100. These leads extend upwardly to connect to the selector switch 34. As shown, the selector switch 34 includes three ganged switch arms 34a, 34b, and 34c. When the selector switch 34 is in the off position, all three of the arms are connected to open terminals. When the selector switch is moved to the center contact or operator position, the switch arm 34a passes power from the lead 99 to a power lead 101. Also, the switch arms 34b and 34c pass power from the power lead 100 to leads 102. All of the leads or electrical lines that are energized from the power line 100 when the selector switch is in the operator position are designated by the numeral 102. All of the leads that are energized by the power lead 99 from the source 98 when the selector switch arms are in the off positions are designated by the numeral 99.

It will be noted that with the switch in the operator position, the power from the lead 99 passes to the top lead 101 and the power from the lead 100 connects to the lead 102 passing from the second and third contacts of the switch arm 34c. The leads 101 and 102 pass to a rectifier and speed control circuit 103 shown at the upper right of the drawing. This circuit includes suitable rectifiers and auto-transformers so that the output rectified voltage may be varied as by the speed control knob 33 described in conjunction with the front panel of FIGURE 1. Thus, there is provided a D.C. field control on output leads 104 connected to the field windings 105 of a D.C. motor M. Energization for the armature of the D.C. motor are provided through output leads 106 and 107 from the rectifier 103. The lead 106, as shown, connects directly to one brush of the armature whereas the lead 107 extends about the lower right hand portion of the drawing to an open terminal forming the upper terminal of a relay switch arm B.

Referring again to the upper left portion of FIGURE 7, when the middle switch arm 34b of the selector switch is on the operator position, power from the power line 100 will pass through the lead 102 to the left foot control pedal 35. The contact of the left foot pedal in turn is connected to a lead 108 passing upwardly to terminate at an upper terminal of the start switch button 31. Connected also to the lead 108 is a relay coil K1 the other side of which connects to the power lead 101 across the top of the figure. The relay K1 operates two switch arms A and B. The switch arm A is connected through a lead 109 to a lower terminal of the stop switch button 32. The upper terminal of the stop switch button in turn is connected through line 110 to the micro-switch arm 68 under control of the cam disc 67 and indent 69 described in conjunction with the rotary indexing unit of FIGURE 3. The other side of the micro-switch arm 68 connects to the auto terminal of the center selector switch.

The switch arm B for the relay K1 is connected through a line 111 directly to the opposite brush for the motor armature. The lower contact of the switch arm B connects to a line 112 passing through a programming switch arm 4 to a left terminal 4L in turn connected to a resistance R3, the other side of which terminates on the line 106 connected to the opposite brush of the armature.

Referring to the left hand portion of the drawing, power line 99 includes a branch terminating at the junction of the three-way solenoid valve 92 for operating the weld arm and the three-way solenoid valve 96 for operating the indexing unit. The other sides of these solenoid coils 92 and 96 connect through leads 113 and 114 respectively to a right hand terminal 1R of a programming switch arm 1 and the left hand terminal 3L of another programming switch arm 3. A branch lead 99 from the power source 98 shown immediately above the index circuit solenoid coil 96 connects to the right foot pedal 36, the other terminal of which connects to one side of the four-way solenoid valve 94 for operating the holding collet. The other side of this solenoid coil 94 connects to the power line 102.

The same power line 102 passes downwardly and connects to the programming switch arm 3 and to the programming switch arm 1.

The electrical circuit is completed by a firing circuit power supply 115 shown in the lower left-hand portion of the drawing from which welding current is provided to the terminal 66 described on the indexing unit housing 13 and the terminal 87 described in conjunction with the weld head assembly of FIGURE 4. Suitable current is provided to these terminals when the firing circuit power supply is triggered. This triggering is effected by leads 116 and 117 connecting respectively to the left-hand terminal 2L of a programming switch arm 2 and to the switch arm 2 itself.

The D.C. motor armature M as indicated by the dashed lines is connected to rotate four programming cam wheels simultaneously. These wheels are designated 1C, 2C, 3C, and 4C and includes lobes for actuating the programming switches 1, 2, 3 and 4 to move the same between their respective terminals designated 1L, 1R, 2L, 3L, 3R, 4L and 4R.

In the operation of the welding apparatus, and with reference to FIGURES 6 and 7, when all of the various switches are shown in their solid line positions, the entire unit is de-energized. Also, with the toggle valve switch 28 shown in FIGURE 6 in its off position, no air pressure is supplied to the system. In this off condition, the various programming cam wheels 1C through 4C are in the solid line positions shown.

If the toggle valve 28 is turned to the on position and the selector switch 34 turned from the off position to the operate terminals, air pressure will be supplied through the four-way valve 94 of FIGURE 6 in the line 95 to the three-way solenoid valve 96. However, the cylinder 56 wil lnot be filled with air since the three-way solenoid valve 96 is not energized at this point. However, the air pressure in the line 95 will pass through the branch line 97 and through the port 49 to the collet holding unit to raise the piston and close the collet on a workpiece positioned therein.

At this point, if the operator desires to remove the workpiece, he need only depress the right-hand foot pedal 36 shown in the center portion of FIGURE 7. Closing of this foot pedal will result in power passing from the lead 99 through the foot pedal 36 and the collet closing solenoid 94 up the lead 102 to the center terminal of the selector switch 34 and through the switch arm 34c, which has been placed on the operator terminal, back to the power line 100 and power supply 98. Energization of the four-way solenoid valve by the coil 94 will remove pressure from the line 95 and apply pressure to the port 50 to lower the piston and thus open the collet. If the operator releases his foot from the right-hand pedal 36, the four-way solenoid valve coil 94 will be de-energized and close the air pressure to the port 50 and again apply pressure on the line 95 to the port 49. It is important in this respect that a workpiece be positioned in the collet if the operator removes his foot from the pedal to close the collet. The operator may thus open and close the collet at will with his right foot in order that the workpiece may be properly adjusted within the collet.

After the workpiece is propely adjusted in the collet, the operator may then either press the start button 31 or close the left foot pedal 35. Either action will initiate a cycle since the left foot pedal 35 is essentially in parallel with the terminals for the start button 31. This parallel connection may be traced as follows: With the selector switch in the operator position, the left foot pedal 35 is connected through the line 102, switch arm 34b, to switch arm 34c and line 102 to the lower terminal of the start push button 31. The other side of the foot pedal line 108 in turn connects directly to the upper terminal of the start button 31.

Assume that the operator now either pushes the start button or closes the left foot switch 35. When this action occurs, power on the line 100 from the power supply 98 will pass through the switch arm 34c of the selector switch, which is in the center position, to the line 102 and the lower terminal of the start button 31. If the start button is closed, this current will then pass through the relay coil K1 to the power line 101 which is energized through the switch arm 34a in the center position connected to the power line 99. Energization of the relay K1 will then close the relay switch arms A and B to their upper terminals.

With the relay K1 energized, movement of the switch arm B to its upper terminal will connect lead 107 from the rectifier 103 to the left-hand brush of the armature thereby energizing the armature and causing the D.C.

motor M to rotate. Rotation of the motor M will rotate the cam wheel 4C thereby moving the lobe and permitting the programming switch arm 4 to move from the left-hand terminal 4L to the right-hand terminal 4R. If the start button 31 is now released, the D.C. motor will still be energized by energy through the lead 107 and the right-hand terminal 4R, switch arm 4 through the lead 112 to the lower terminal of the switch arm B, the switch arm B returning to this lower terminal when the relay coil K1 is de-energized upon opening of the start button 31. Thus, the D.C. motor will continue to operate and the various cam wheels 1C through 4C will be rotated. It should be noted in this regard that even if the stop button 32 is now operated it will not de-energize the D.C. motor, it being necessary that the motor go through a complete cycle to return the cam wheel 4C to a position in which it will move the switch arm 4 from the right terminal 4R to the left terminal 4L before the motor can be de-energized. Thus, the system must go through a complete cycle once it has been started.

Referring now to the first cam wheel 1C at the extreme left of the drawing, as the motor rotates the cam wheels, the lobe on the cam wheel 1C will move the switch arm 1 from the right-hand terminal 1R to the left-hand open terminal 1L. As a consequence, the weld arm raise solenoid 92 will be de-energized. In this respect, it should be noted that when the selector switch is moved to the operator position even prior to closing of the start switch, power is supplied on the lead 102 through the third switch arm 34c and thus to the programming switch arm 1 and through the coil 92 to the power supply 98 by return lead 99. Thus, the weld arm raise solenoid is operated to operate the piston 82 in FIGURE 6 and hold the weld arm in a raised position. However, when the start button is actuated so that the cam wheel 1C is caused to rotate, power is removed from the coil 92 thereby permitting the spring to lower the weld arm against the work.

In the next step of the cycle, while programming switch arm 1 is on the 1L terminal, the cam wheel 2C has a lobe which will move the programming switch arm 2 from the terminal 2R to the terminal 2L thereby closing the circuit 116 and 117 and causing the welding current power supply to provide welding current to the terminals 66 and 87. Thus a weld will be effected in response to closing of this switch arm while the weld arm is in its down position. Continued rotation of the cam wheel 2C will remove its lobe portion from the switch arm 2 so that it will return to the terminal 2R thereby terminating operation of the firing circuit. Shortly thereafter, the lobe on the cam wheel 1C will move off of the switch arm 1 so that the weld arm raise solenoid 92 will raise the welding electrode.

In the next step, the lobe on cam wheel 3C will move the switch arm 3 to the terminal 3L and power will be supplied from the power lead 102 through the switch arm 3 to the indexing circuit solenoid 96 and back through the lead 99 to the power supply. Thus, the three-way solenoid valve 96 for operating the indexing unit will function to cause the clevis 54 to index the collect through a given circumferential distance. When the lobe on the cam wheel 3C has passed the switch arm 3, the switch arm will return to the open terminal 3R and thus permit air to be exhausted from the indexing unit cylinder 56 so that the return spring will return the outer clutch to its former position as described in conjunction with FIGURE 3.

Finally, after the indexing operation has taken place, the cam wheel 4C will be positioned so that its lobe again bears against the programming switch arm 4 to return this switch arm from the terminal 4R to the terminal 4L. When the switch arm 4 engages the terminal 4L, the armature of the D.C. motor will be short-circuited through the resistance R3 since the relay K1 is de-energized and the switch arm B is in its lower position. There will thus be provided a dynamic braking action on the D.C. motor and the motor will be de-energized until the relay coil K1 is again energized.

To energize the relay coil K1 a second time, it is necessary to either depress the left foot pedal or depress the start switch to initiate another cycle. It is to be emphasized that once the cycle has been initiated so that the cam wheel 4C permits the switch arm 4 to move to the terminal 4R, the cycle must continue until a complete revolution of the cam wheel 4C has taken place.

The foregoing cycle is an extremely important feature of this invention as it insures that regardless of the operation of the various switches, a cycle will always be completed.

Referring now once again to the selector switch 34, if the switch arms are moved to the auto position a complete repetition of the cycling will take place until the workpiece has been rotated through 360 degrees. Towards this end, with the selector switch on the third or auto terminal, it will be noted that a circuit will be completed through the switch arm 34b of the selector switch to the micro-switch 68 under control of the cam disc 67 in the rotary indexing unit. It will also be noted that when the selector switch is in its third or auto position, the left foot pedal is essentially out of the circuit so that it cannot be used to initiate operation but rather the start button 31 must be used.

Assuming now that the various switch arms of the selector switch 34 are in the third or auto position, if the operator now depresses the start button 31, the relay K1 will be energized from the power 98 by way of the lead 100 passing through the third switch arm 34c to the line 102, terminals for start buttons 31, relay K1 to the line 101 energized by the power lead 99 through the first switch arm 34a when in its third position. Energization of the relay K1 will move switch arms A and B to their upper positions. Again, with the switch arm B in its upper position, the D.C. motor armature will be energized to commence the sequential operation of a single cycle. However, it is to be noted that since power from the lead 100 is applied to the auto terminal through the center switch arm 34b of the selector switch and the micro-switch 68 and line 110 through the stop button terminals and the switch arm A to the underside of the relay coil K1, the relay coil K1 will remain energized even though the start switch is released. With the relay coil K1 continuously energized, the operation of the programming switch arm 4 cooperating with the cam wheel 4C between the terminals will have no effect since the lower terminal of the switch arm B is open so long as the relay K1 is energized. Therefore, the various cam wheels will continuously rotate and the various weld, arm lowering, weld, weld arm raise, and rotary index steps will repeat. As stated, these cycles will repeat until the indent in the disc 67 opens the micro-switch 68. At this time, energy is removed from the bottom of the relay coil K1 permitting the switch arms A and B to return to their lower terminals. However, the motor will still be energized unless at this point the cam wheel 4C is holding the switch arm 4 against the terminal 4L. Otherwise, the motor will operate until the cam wheel 4C moves the switch arm 4 to the terminal 4L to terminate operation of the apparatus. Thus again a cycle must be completed before the operation of the apparatus is terminated.

It will be evident that when operation of the apparatus is terminated by action of the cam wheel 4C, the other cam wheels will be in their same relative positions illustrated in FIGURE 7 preparatory to the initiation of another cycle.

It is possible of course for the operator to hold the start button 31 closed intentionally, or alternatively, in the event the selector switch is in the operator position, to hold the left foot pedal 35 closed intentionally. As long as one or the other of these switches are closed, the system will continuously cycle since the relay K1 will be continuously energized. At any point where the switches are released or at any point where the stop switch 32 is open, however, the system will terminate operation only after the particular cycle during which the switches were manipulated is completed. Since the stop switch 32 is connected in series with the micro-switch 68, it will be evident that the apparatus may be stopped during an automatic 360 degrees sequence when the selector switch is in the auto position. However, even with the selector switch in the auto position the sequence may be started again by releasing the stop button 32 and simply closing the start button again. The sequence will then continue to operate until the micro-switch 68 is opened.

From the foregoing description, it will be evident that the present invention has provided a greatly improved welding apparatus in which all of the various objects set force heretofore have been fully realized.

It is to be understood that while only one particular embodiment of the invention has been set forth, various equivalent means for performing the respective functions described may be substituted for those shown. The welding apparatus is therefore not to be thought of as limited to the specific example set forth merely for illustrative purposes.

What is claimed is:

1. A seam welding apparatus for successively welding a workpiece comprising, in combination: a weld head assembly for moving a welding electrode; a welding current power supply for passing welding current to said head assembly; a holding collet and indexing unit for holding a workpiece in position to be engaged by said welding electrode and including means for rotating said workpiece through a discrete circumferential distance; and control means connected to said weld head assembly, welding current power supply, and holding collet and indexing unit for operating the same in a sequential cycle in which said welding electrode engages said workpiece, welding current is passed therethrough, said welding electrode is moved away from said workpiece, and said workpiece is rotated by said holding collet and indexing unit through said discrete circumferential distance, said control means including selective switch means, said control means automatically completing only one cycle and then terminating operation of said apparatus when said selector switch means is in one position and said control means automatically repeating said cycle until said holding collet has been rotated through 360 degrees and then terminating operation of said apparatus when said selective switch is in another position.

2. A seam welding apparatus for successively welding a workpiece comprising, in combination: a weld head assembly for moving a welding electrode; a welding current power supply for passing welding current to said head assembly; a holding collet and indexing unit for holding a workpiece in position to be engaged by said welding electrode and including means for rotating said workpiece through a discrete circumferential distance; and control means connected to said weld head assembly, welding current power supply, and holding collet and indexing unit for operating the same in a sequential cycle in which said welding electrode engages said workpiece, welding current is passed therethrough, said welding electrode is moved away from said workpiece, and said workpiece is rotated by said holding collet and indexing unit through said discrete circumferential distance, said holding collet and indexing unit including an elongated tail piece secured to said holding collet at its upper end; means rotatably mounting said collet and tail piece; an inner clutch race secured to the lower end of said tail piece; an outer annular clutch race surrounding said inner clutch race, said inner and outer clutch races including cooperating clutch surfaces such that rotation of said outer clutch race in one direction rotates said inner clutch race and rotation of said outer clutch race in an opposite direction permits said inner clutch race to remain stationary; an electrically conducting means having a central portion engaging a portion of said tail piece and exerting a frictional drag thereon; and, a biasing means, one portion of said conducting means cooperating with said biasing means for exerting a continuous pressure against said tail piece, another portion of said conducting means terminating in a terminal whereby said conducting means serves to hold said tail piece in a stationary position when said outer clutch race is moved in said opposite direction and serves to conduct welding current to said terminal passes from said workpiece and holding collet to said tail piece.

3. An apparatus according to claim 2, including means for adjusting the distance through which said outer clutch race is moved in said one direction whereby said discrete circumferential distance through which said workpiece is rotated is adjustable.

4. A seam welding apparatus for successively welding a workpiece comprising, in combination: a weld head assembly for moving a welding electrode; a welding current power supply for passing welding current to said head assembly; a holding collet and indexing unit for holding a workpiece in position to be engaged by said welding electrode and including means for rotating said workpiece through a discrete circumferential distance; and control means connected to said weld head assembly, welding current power supply, and holding collet and indexing unit for operating the same in a sequential cycle in which said welding electrode engages said workpiece, welding current is passed therethrough, said welding electrode is moved away from said workpiece, and said workpiece is rotated by said holding collet and indexing unit through said discrete circumferential distance, said weld head assembly including a weld arm pivoted intermediate its ends at a given point, one end of said arm terminating in said welding electrode so that swinging movement of said arm raises and lowers said electrode; a support structure stationary with respect to said arm and including a member engaging said arm; and spring means urging said member against said arm to bias said electrode downwardly with a given force, said control means including means adapted to bear downwardly on the opposite end of said arm to raise said electrode whereby actuation of said means raises said welding electrode and de-actuation of said means permits said electrode to be lowered by said spring and member so that the force of said electrode against said work is determined solely by said spring.

5. An apparatus according to claim 4, in which said member moves against said welding arm in a direction normal to a line drawn between the point of engagement of said member with said arm and said given pivot point, and the end of said welding electrode moves into engagement with said work in a direction parallel to the axis of rotation of said holding collet.

6. A seam welding apparatus comprising, in combination: a supporting base; a drive unit housing including pneumatic and electro-mechanical control means, said housing being secured to said base and extending upwardly therefrom; a workpiece holding collet and indexing unit; horizontal slide means mounting said collet and indexing unit for horizontal movement relative to said base; vertical slide means mounting said horizontal slide means to said drive unit housing for vertical movement relative to said base; a weld head assembly secured to said drive unit housing and extending over said collet unit, said weld head assembly including a weld arm pivoted intermediate its ends for raising and lowering one end of said arm, said one end terminating in a welding electrode positioned to engage said workpiece when said arm is lowered, the other end of said arm terminating within said drive unit housing; and a control box mounted on said drive unit housing for operating said pneumatic and electro-mechanical control means in a sequential cycle to lower said weld arm, pass welding current through said welding electrode and workpiece, raise said weld arm, and rotate a workpiece held in said holding collet through a given circumferential distance.

7. An apparatus according to claim 6, including means for causing said cycle to repeat automatically until said workpiece holding collet has been rotated a total of 360 degrees.

8. An apparatus according to claim 6, including two foot pedal control means for opening and closing said workpiece holding collet, and for initiating said cycle, respectively.

9. An apparatus according to claim 6, including means for varying the speed of said cycle.

10. An apparatus according to claim 6, including means for varying said given circumferential distance.

11. An apparatus according to claim 6, including an adjustable up-stop rod secured to said drive unit housing for checking upward movement of said holding collet and indexing unit at a predetermined level.

References Cited by the Examiner

UNITED STATES PATENTS

| | | | |
|---|---|---|---|
| 945,472 | 1/1910 | Moores | 318—468 |
| 1,078,815 | 11/1913 | Wiegand | 318—468 |
| 1,554,385 | 9/1925 | Still | 219—159 X |
| 1,601,346 | 9/1926 | Callahan. | |
| 1,703,588 | 2/1929 | Meadowcroft | 219—80 |
| 1,826,207 | 10/1931 | Fossler | 219—159 X |
| 2,727,122 | 12/1955 | Gartner | 219—86 |
| 2,883,515 | 4/1959 | Owens | 219—86 |

ANTHONY BARTIS, *Acting Primary Examiner.*

RICHARD M. WOOD, JOSEPH V. TRUHE, *Examiners.*